June 10, 1952     H. R. SCIVALLY     2,600,336
WELL LOGGING APPARATUS
Filed Nov. 2, 1950     9 Sheets-Sheet 1
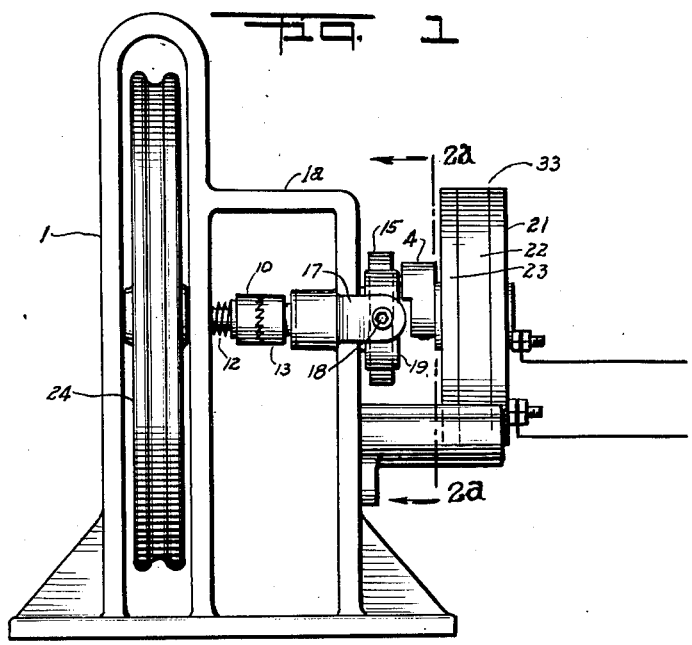
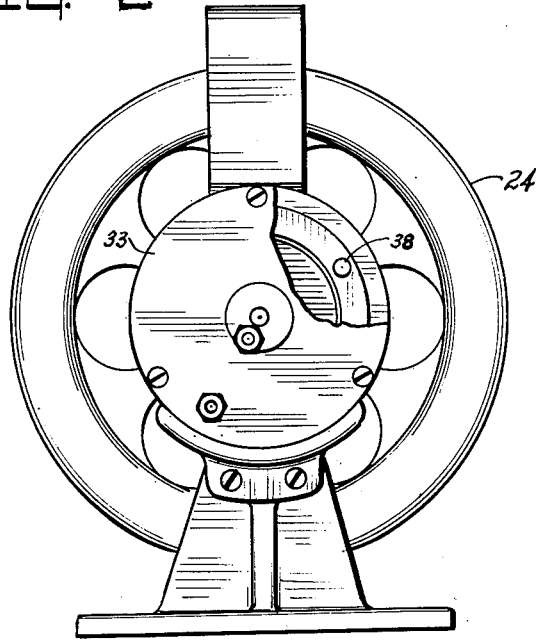
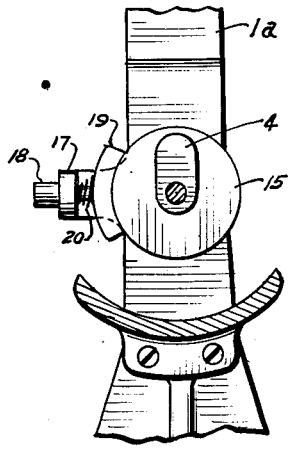
INVENTOR.
*Herschell R. Scivally*
BY
ATTORNEY June 10, 1952  H. R. SCIVALLY  2,600,336
WELL LOGGING APPARATUS
Filed Nov. 2, 1950  9 Sheets-Sheet 2
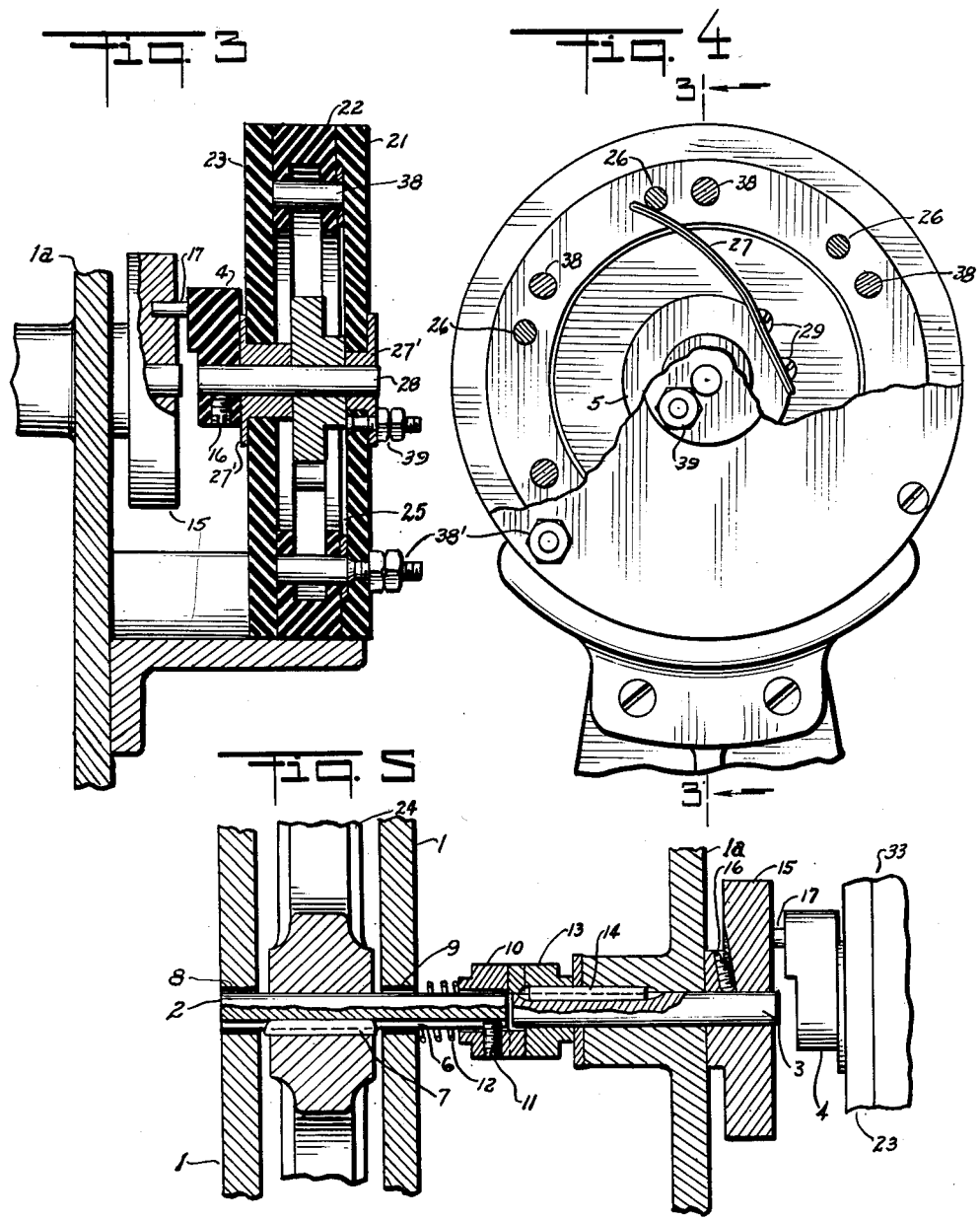
INVENTOR.
Herschell R. Scivally
BY
Philip J. Liggett
ATTORNEY

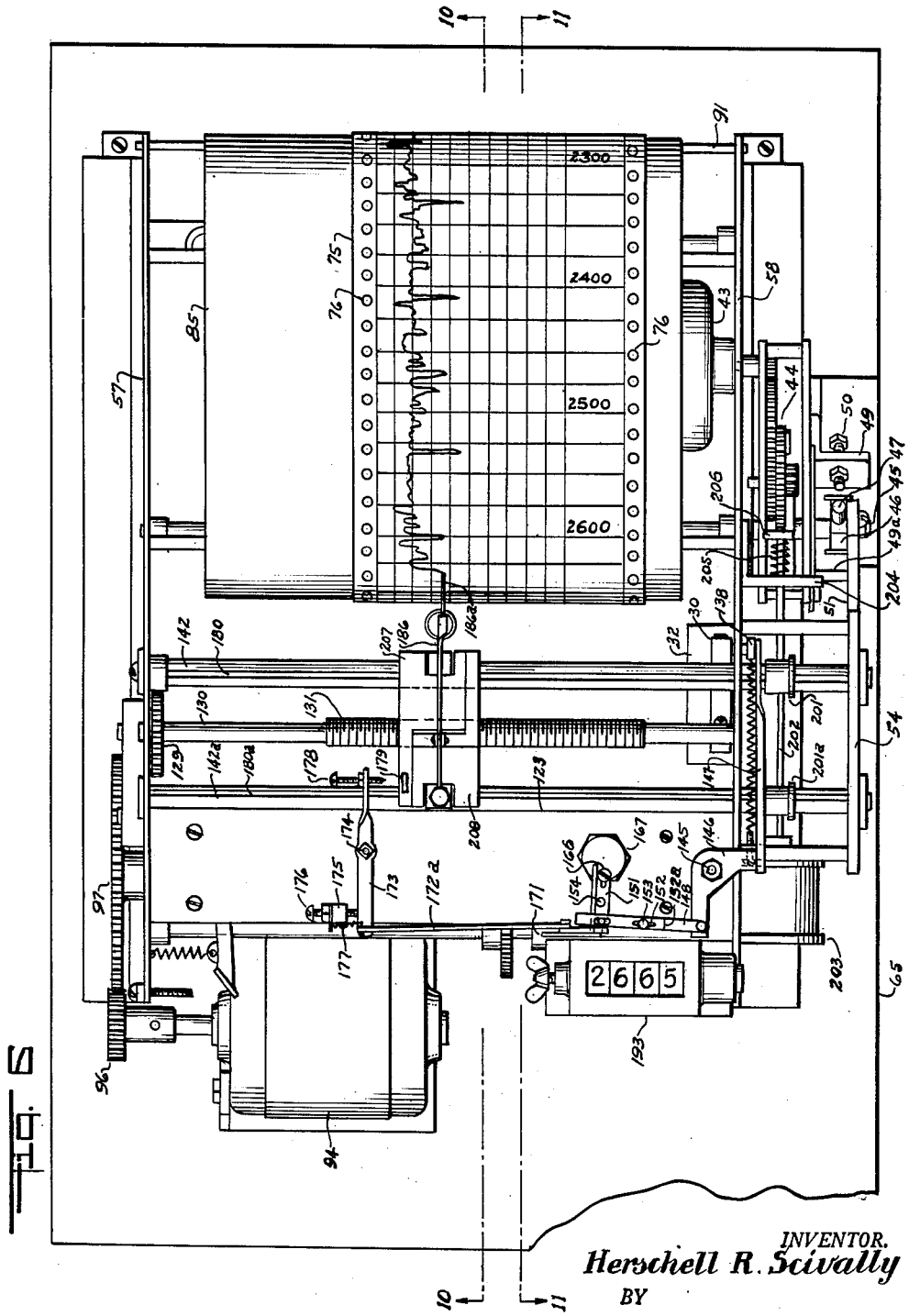

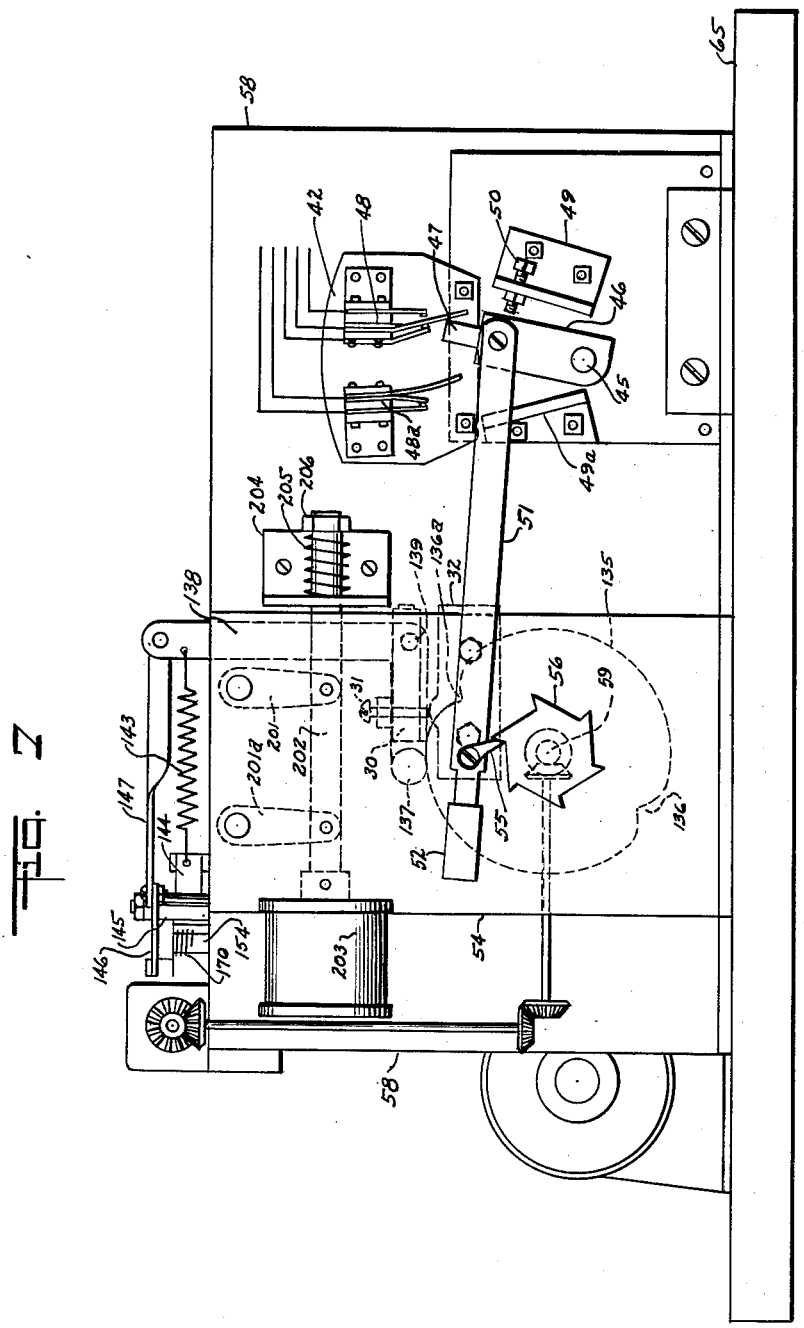

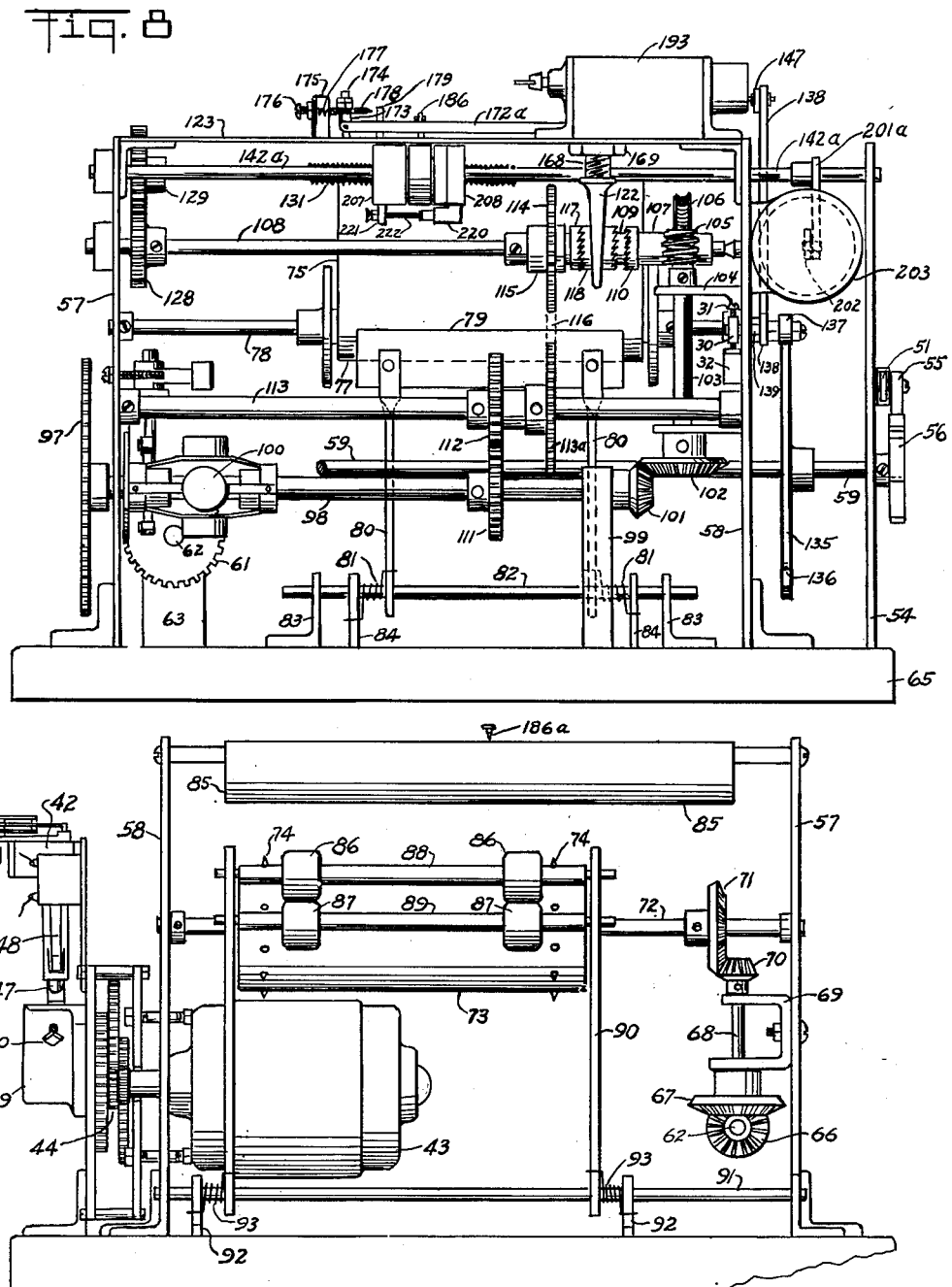

June 10, 1952 — H. R. SCIVALLY — 2,600,336
WELL LOGGING APPARATUS
Filed Nov. 2, 1950 — 9 Sheets-Sheet 6
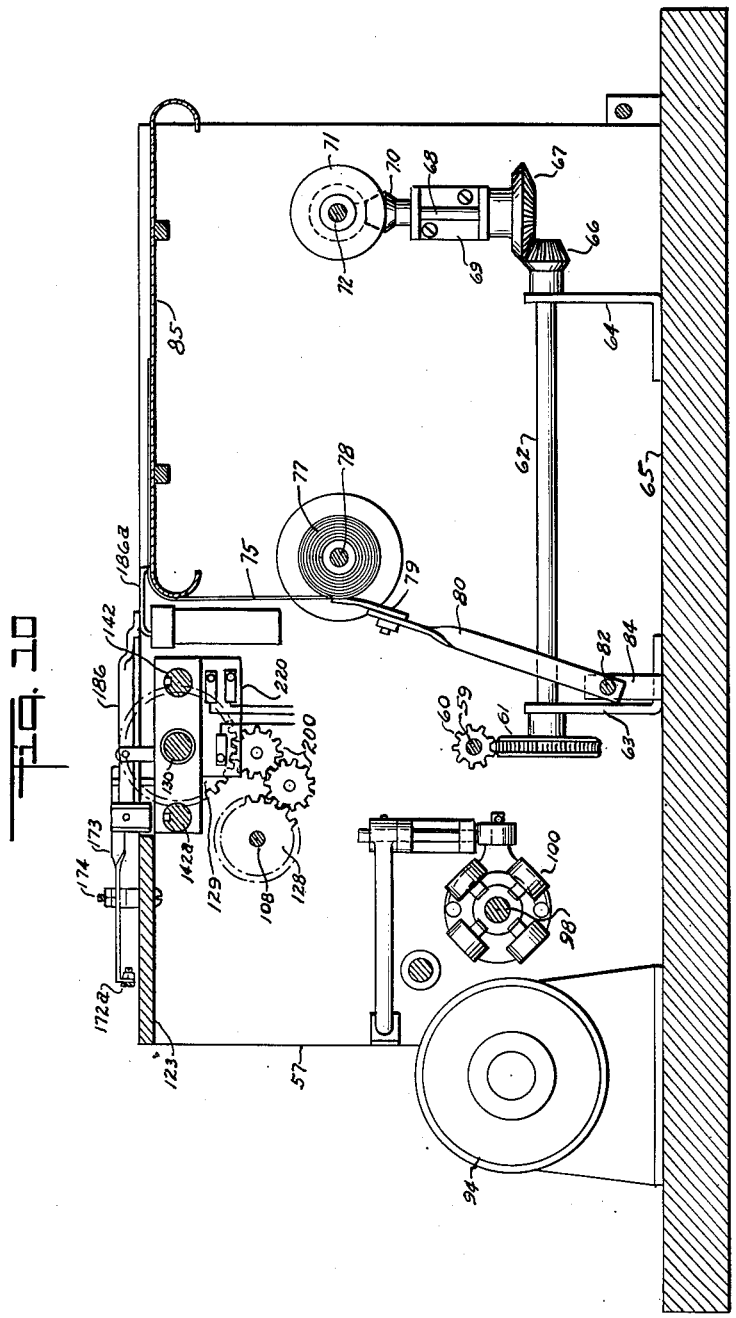
INVENTOR.
Herschell R. Scivally
BY
Philip J. Liggett
ATTORNEY June 10, 1952
H. R. SCIVALLY
2,600,336
WELL LOGGING APPARATUS
Filed Nov. 2, 1950
9 Sheets-Sheet 7
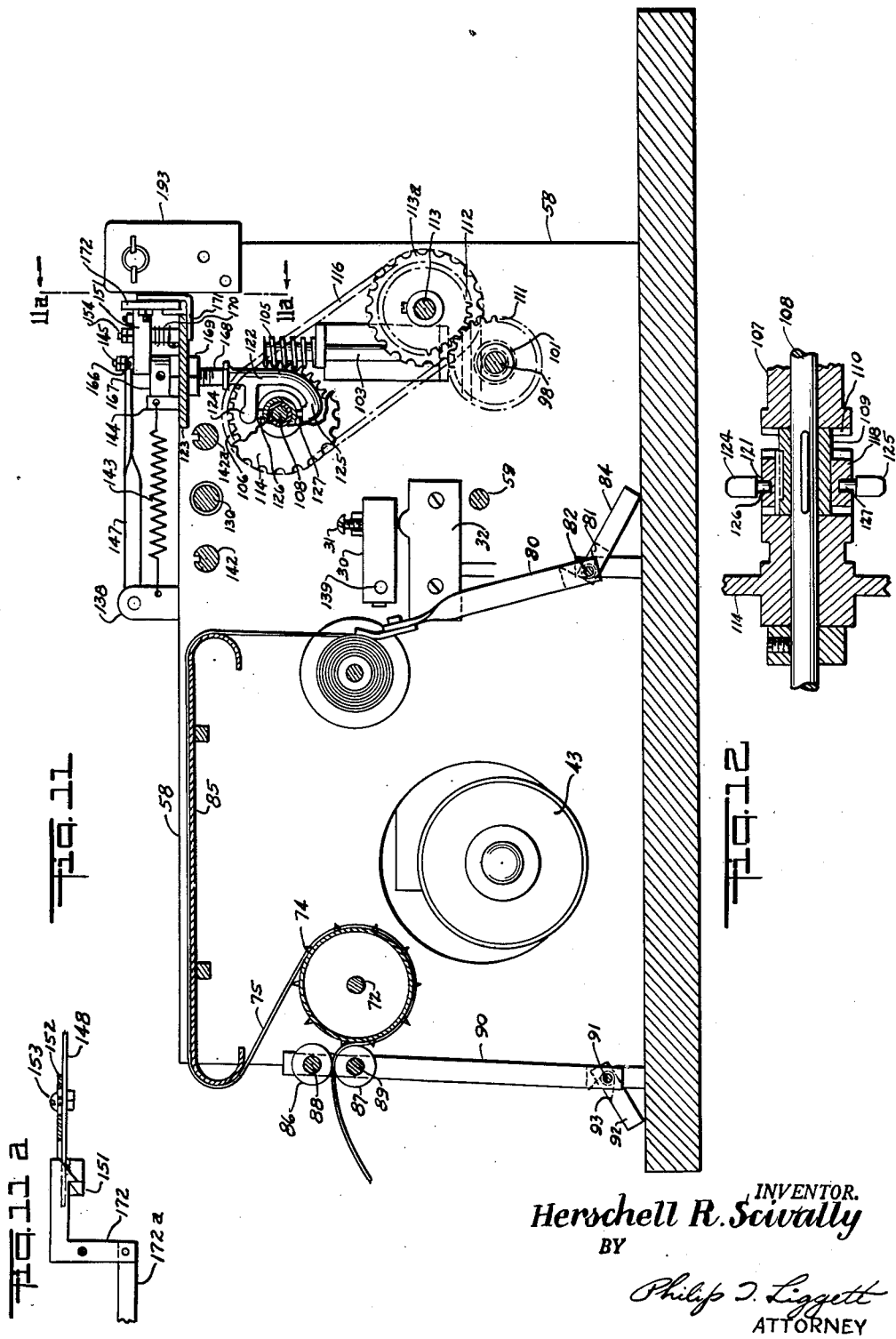
INVENTOR.
Herschell R. Scivally
BY
Philip T. Liggett
ATTORNEY

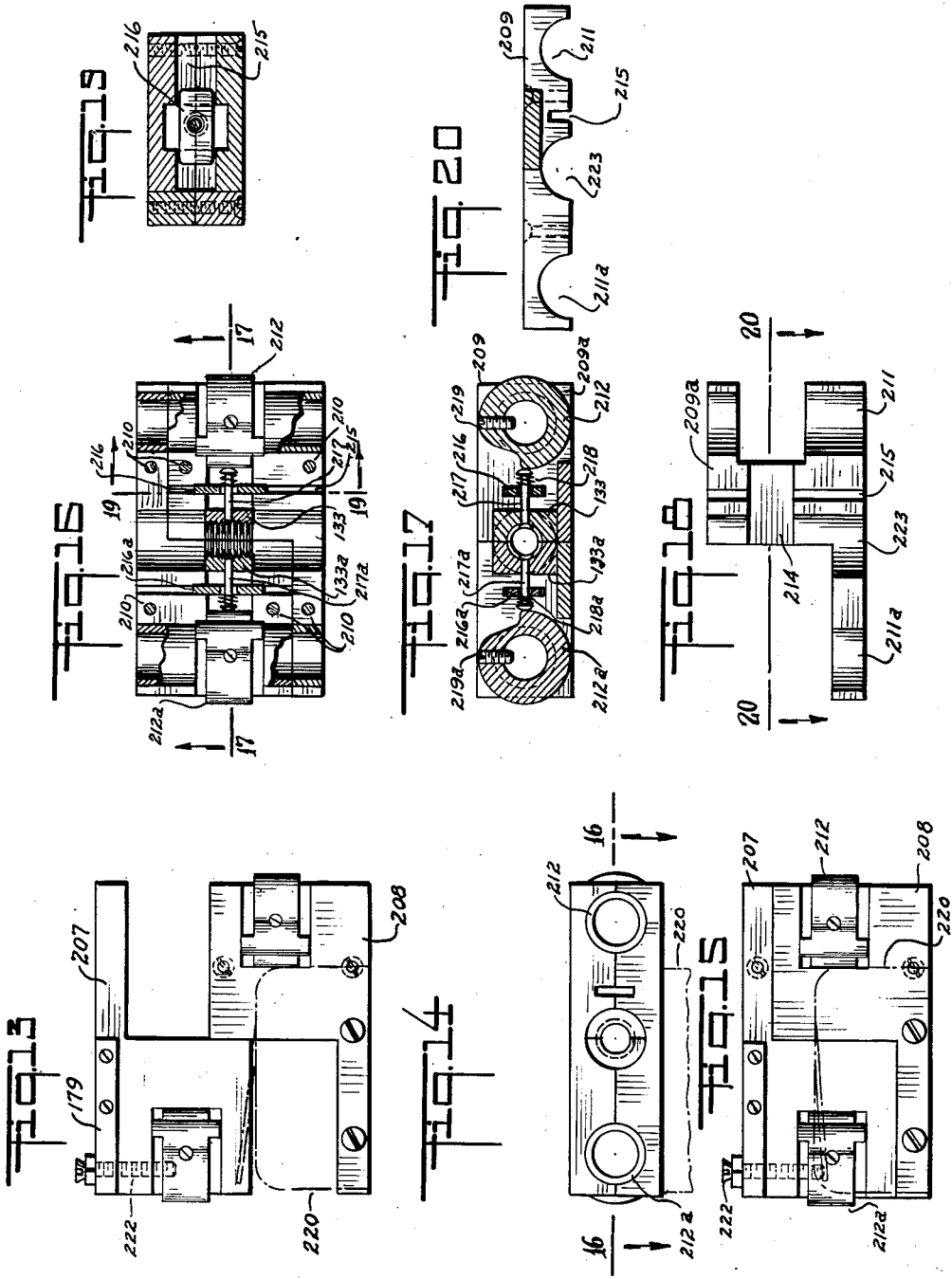

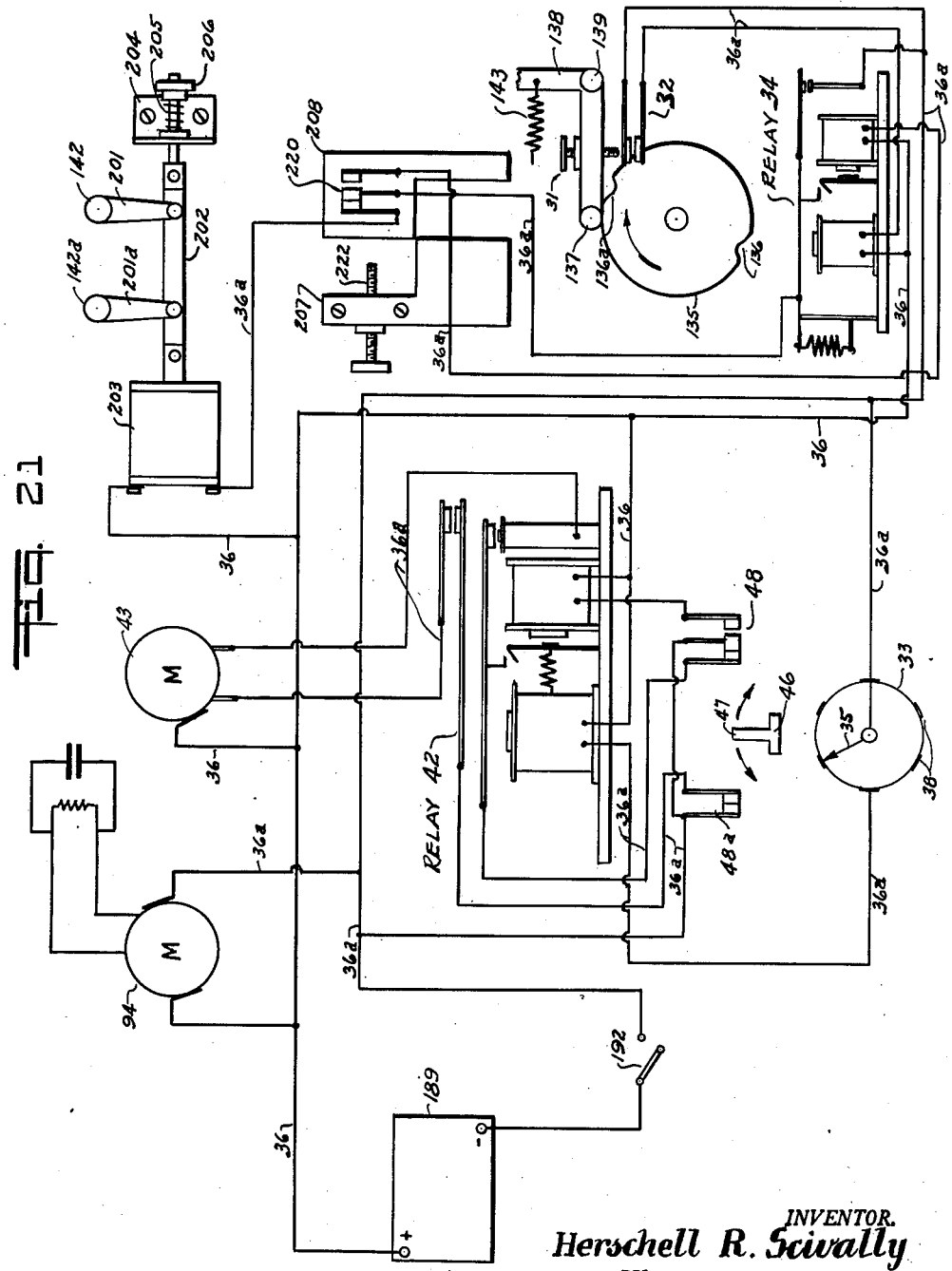

Patented June 10, 1952

2,600,336

UNITED STATES PATENT OFFICE 2,600,336

WELL LOGGING APPARATUS

Herschell R. Scivally, Shreveport, La.

Application November 2, 1950, Serial No. 193,590

8 Claims. (Cl. 346—39)

This application is a continuation-in-part of my present application Serial No. 692,503, filed August 23, 1946, and now issued as United States Patent No. 2,535,096.

The present invention relates to an improved well logging apparatus which is adapted for use with rotary drilling rigs and for producing a permanent record or log of the relative densities of the various strata encountered by the drill in the drilling of a well. More specifically the improved apparatus provides means for making a log or graph with a marking stylus which is in continuous contact with a driven chart, so that as a result visible data, in its most desirable form, is provided which will indicate the relative hardness of the various strata. In other words, the resistance offered the drill, of the various strata pierced by the drill, as the drilling of the well progresses, is made into a graphic record to scale, so that the character of the log so obtained may be identified and correlated from one well to another, and from one area to another.

The majority of present types of well logging devices effect charts which are a series of straight lines, peaks, dots, or other markings, which subsequently require additional work to put them in the most desirable useful form.

It is therefore a principal object of the present invention to provide a well logging apparatus which provides a desirable form of single line graph or chart by maintaining a marking stylus in constant contact with a moving chart to in turn record the time required for drilling each foot or interval of depth, as well as indicating the difference in time consumed in drilling each foot of formation encountered.

It is a further object of this invention to provide a completely automatic form of apparatus which is readily connected to a drilling rig and operated by the descending drill stem or kelly therein.

Additional objects and advantages of the improved apparatus will be noted in connection with the further specification and description of the drawings.

Briefly the modified and improved well logging machine for use with rotary drilling equipment comprises in combination, means holding and advancing a movable record-receiving element, with the holding and advancing means connecting to the drilling equipment in a manner advancing the record receiving element at a rate of speed determined by the speed of the downward movement of the drill stem of the drilling equipment, a movable stylus maintained in contact with the record receiving element, a movable stylus carriage having portions thereof adapted to engage and disengage with a power driven screw shaft, a movable clutch and gearing connecting the screw shaft with a driving means rotating the latter at selected rates of speed, linkage and gearing connecting the clutch with the means for holding and advancing the record receiving element, with the linkage and gearing means operative with the advancing means to move said stylus, engage a threaded portion of the stylus carriage, and reverse the direction of rotation of the screw shaft and the movement of said threaded portion, whereby to provide a continuous single line marked record of the time consumed for a predetermined increment of downward movement of the drill stem.

In accordance with the present improved construction the stylus carriage has two movable portions, a timing section and a stylus holding or marking section. Each section has means which permits it to be engaged with and disengaged from the screw shaft, which in turn effects their lateral or transverse movement with respect to the record receiving element. As will be more fully described and explained in connection with the drawing, mechanical and electrical relay means are combined in their action to provide for the independent and controlled movement of each section of the carriage and the proper marking of the chart. At the end of each increment of depth, the apparatus causes the timing section or element to move to the zero line of the chart and effect its readiness for a regulated and timed movement, transversely with respect to the chart, for the next increment of downward movement of the drill stem, and during the resetting period the stylus element is disengaged from the screw shaft. However, the two sections are subsequently brought together, with the timing element pushing the stylus element further across the record receiving element, or alternatively where the timing element does not move as far from the zero line as it did on a previous movement, then an electrical relay and suitable linkage and gearing means effects the rapid reverse movement of the stylus element to bring the latter into contact with the timing element. The timing element then moves back to the zero line, leaving the stylus section at the zone of contact, which was the point of furthest movement for the timing section for that depth increment. The stylus is of course in contact with the record receiving element at all times, making a continuous marking of the difference in the time consumed in drilling each foot, or increment of depth, of formation encountered.

The accompanying drawings show in diagrammatic detail the construction and operation of the present improved apparatus.

Figures 1 and 2 are elevational views of a portion of the apparatus which houses a wheel and commutator which are adapted to be turned by a cable or wire connecting to the kelly of a drilling rig.

Figure 2a is a sectional view, showing a braking wheel, as indicated by line 2a—2a in Figure 1.

Figures 3 and 4 are partial sectional views through the electrical commutator portion of the device.

Figure 5 is a sectional view through the shaft and ratchet construction connecting the wheel and commutator portions.

Figure 6 is a plan view of the recording apparatus with the cover removed.

Figure 7 is a side elevational view of the machine.

Figure 8 is a front elevational view of the machine, with the governor controlled motor removed.

Figure 9 is a rear elevational view.

Figure 10 is a longitudinal sectional view taken on the line 10—10 in Figure 6 of the drawing.

Figure 11 is another longitudinal sectional view taken on the line 11—11 in Figure 6.

Figure 11a is a fragmentary elevational view showing the latch for the clutch mechanism.

Figure 12 is an enlarged fragmentary sectional view of the reversing clutch assembly.

Figure 13 is a plan view of the sectional stylus carriage, with the sections thereof spaced from one another.

Figure 14 is a side view of the carriage.

Figure 15 is another plan view, with the stylus carriage sections touching one another.

Figure 16 is a sectional plan view, as indicated by the line 16—16 in Figure 14 of the drawing.

Figure 17 is a sectional elevational view, as indicated by the line 17—17 in Figure 16.

Figure 18 is a plan view of the lower portion of one of the carriage sections.

Figure 19 is a sectional view as indicated by the line 19—19 in Figure 16.

Figure 20 is a sectional view through the portion shown in Figure 18, as indicated by line 20—20.

Figure 21 is a diagrammatic view of the wiring circuits.

Referring now to the drawings, a portion of the measuring apparatus as shown in Figures 1 through 5, is fastened by clamps in a suitable location on a cross member in the derrick. One end of a small wire line is fastened to the gooseneck or kelly and runs from there to a block fastened at the top of the derrick just under the water-table, then down to and around the measuring wheel 24, then up through another block on the side of the derrick, then to a dolly or weight running on a guy line fastened to the derrick leg. The weight being to keep the line tight around the measuring wheel 24. As the kelly moves downward during the progress of drilling, the wheel 24 is rotated in a clockwise direction (see Figures 4 and 5), and through the shafts 2 and 3 and bell crank 4, rotates the armature 5 of the commutator 33. Wheel 24 is fixed on shaft 2 through keyway 6 and key 7. The shaft rotates in frame 1 and bearings 8 and 9 on the inside of frame 1 and on shaft 2 is a ratchet collar 10 which is slidably mounted on shaft 2 with pin 11 in keyway 6. Spring 12 is positioned between frame 1 and collar 10 exerting a pressure against collar 10 engaging the teeth of the collar 10 in the teeth of collar 13 which is fixed on shaft 3 by key 14. Shaft 3 extends through frame 1a in a suitable bearing and on the outer end is a brake-wheel 15 fixed by set screw 16. On the outer edge of frame 1a is a lug or bracket 17 being a portion of the casting of frame 1 and 1a, best shown in Figure 2a. Through the lug 17 is a cap screw 18 holding brake shoe 19 in position on brake-wheel 15. Spring 20 holds a tension against brake shoe 19 and brake-wheel 15. The function of the mechanism being such that as the wire line is drawn downward by the descent of the drill pipe and bit, the wheel 24 will revolve in one direction causing the shafts 2 and 3 and ratchet collars 10 and 13 to revolve and also brake wheel 15, but as the drill pipe and bit is withdrawn, or moved upward for any reason from off bottom, the brake wheel 15 will not allow it to rotate, thereby causing the teeth of ratchet collar 10 to slide over the teeth of ratchet collar 13.

Fixed in the side of brake wheel 15 is a pin 17 extending into a slot in bell crank 4 which is made of a non-conductive material suitable to insulate commutator 33 from the rig. Commutator 33 is constructed of a non-conductive material being in three parts, and comprising a face plate 21, a center section 22 and back plate 23. Center section 22 is a recessed ring through which are placed six electrically inter-connected segments 38 which are spaced an equal distance apart thereround. The segments 38 being connected by conductor ring 25, shown in Figure 3, with one segment extending through conductor ring 25 to act as a terminal for an electrical wire from the recording mechanism. Equally spaced in front of segments 38 are stop pins 26 which are insulated from the flexible commutator brush 27. As the armature of the commutator is revolved, the flexible brush 27 will contact the stop pins 26, and after dragging over the latter will provide a snap contact with the segments 38.

The centers of face-plate 21 and back plate 23 are fitted with bearings 27′ in which armature shaft 28 rotates. Fixed to the shaft is the armature 5 on which is fastened the flexible brush 27 by screws 29. Since the armature 5 is connected through bell crank 4 to the brake-shoe 16, rotation is limited to one direction as previously explained. Thus six electrical impulses occur for each revolution of the measuring wheel 24 since the brush 27 completes an electrical circuit each time the brush comes into contact with a segment 38. These impulses are transmitted through electrical wires to the recording instrument. The electrical wires are connected to the protruding terminal 38′ and the brush-terminal 39 shown in Figures 3 and 4.

As previously stated, the downward movement of the kelly is reflected by the electric impulses transmitted by the commutator 33. In the particular illustration, the measuring wheel 24 is 24 inches in circumference and the electrically interconnected spaced segments on the commutator 33, being six in number, there is one electric impulse to each four inches of downward movement of the drill stem. These impulses are transmitted to a latch type, double pole, double throw relay 42, on the side of the recorder, as shown in Figures 7 and 9, which serves as a reversing switch in the circuit of the motor 43.

When the master coil of the relay 42 has been energized the armature of said relay is lowered and maintained in that position thus completing the electrical circuit through said motor 43 and starting said motor. Thereupon the reduction gearing 44, operatively connected with said motor, will be driven and the shaft 45 of said gearing will be oscillated in a clockwise direction. Fixed on this shaft there is an arm 46 which will be correspondingly oscillated in a clockwise direction. The upper end of this arm terminates in a knob 47 and during said movement of said arm this knob 47, which is insulated from said arm, will strike a flexible arm of the single pole, double throw limit switch 48, which switch is normally closed on one pole completing the circuit to the master coil of relay 42. Upon contact of the knob 47 with the flexible arm, the circuit to the master coil is open and the circuit on the latch coil of the relay 42 will thus be closed allowing the armature of the relay to spring open to its normal position. The electrical contacts will thus be closed completing a circuit for the counterclockwise movement of the arm 46 thereby reversing the motor 43. The range of movement of the arm 46 will be limited by the spaced brackets 49 and 49a, one of which is provided with an adjusting screw 50 which may be adjusted to vary the range of movement. The reversal of the motor 43 causes the arm 46 to move in a counter-clockwise direction causing the insulated knob 47 to strike the flexible arm of the limit switch 48a, which is normally closed, and resulting in breaking of the circuit through the motor 43, thus stopping the motor and allowing the arm 46 to come to rest against the bracket 49 in which position it remains with the limit switch 48a open until another electric impulse is transmitted by the commutator 33 to the master coil of relay 42. Thus, the cycle of movement of the arm 46 is completed from left to right and returned regardless of the time consumed in the brush of commutator 33 passing over one of the spaced contacts 38.

Also, as shown in Figure 7, there is a connecting rod 51 having one end pivotally connected to the arm 46 and its other end slidably connected to a bracket 52 which, in turn, is fastened to the auxiliary side frame 54. Pivotally mounted on the connecting rod 51 there is a pawl 55 which is arranged to engage with, and turn, the ratchet wheel 56 as the connecting rod oscillates. The recording apparatus has a framework which includes the vertical side plates 57 and 58 to the latter of which the auxiliary side frame is attached. The ratchet wheel 56 is fixed on the outer end of the shaft 59, which in turn, is mounted to rotate in suitable transversely aligned bearings in the vertical frame plates 57 and auxiliary side frame 54. One cycle of movement of the arm 46 pulls the ratchet 56 in a clockwise direction a distance of one tooth and returns the pawl 55 into position to engage the subsequent tooth. There are six teeth on the ratchet 56, in the present illustration, and since one cycle of movement of the arm 46 is caused by the electrical impulses from the commutator 33 which occur with each four inches of downward movement of the kelly then six cycles of movement of the arm 46 effect a complete revolution of the shaft 59, that is to say each two feet of downward movement of the kelly, or drill stem, the shaft 59 will perform one complete revolution. The shaft 59 is suitably mounted in the framework against endwise movement thereof.

As best shown in Figure 10, there is a pinion 60 fixed on the shaft 59 which is in mesh with, and drives, a worm gear 61 which is fixed on the forward end of the longitudinal shaft 62. This shaft is mounted to rotate in bearings in suitable front and rear brackets 63, 64 which are fixed to and upstand from the base 65 of said main framework.

Fixed on the rear end of the shaft 62 there is a bevel gear wheel 66 which is in mesh with, and drives, a bevel gear wheel 67 which is fixed on the lower end of the vertical shaft 68. This shaft is mounted to rotate in the upper and lower bearings of a bracket 69 which is attached to the vertical side plate 57.

Fixed to the upper end of the shaft 68 there is a bevel pinion 70, which is in mesh with, and drives, a bevel gear wheel 71 which is fixed on the shaft 72. This shaft 72 is mounted to rotate in transversely aligned bearings in the main frame side plates 57 and 58.

Fixed on the shaft 72 there is a cylinder 73 of a selected circumference and which is provided, at its end, with the radial outwardly extended pins 74 arranged in series around the drum and spaced an equal distance apart. There is a record-receiving element 75, best shown in Figures 6, 10 and 11, and which is provided with marginal holes 76 through which said pins engage to move said record-receiving element as the cylinder rotates. Thus, by varying the ratio of the worm gear 61 relative to its pinion 60 and by varying the ratio of the pinions 66 and 70 relative to the bevel gears driven by them, any desired vertical scale on the record-receiving element 75 may be obtained to correspond to the depth of the well.

The record-receiving element is wound into a supply roll 77 which is mounted on a transverse shaft 78. This shaft has end bearings in the side plates 57, 58, as best shown in Figure 8.

There is a transverse friction plate 79 which is in frictional engagement with the supply roll 77. It is fastened to the upper ends of the arms 80, and is maintained in frictional engagement with said roll by the spring 81. The lower ends of the arms 80 have bearings on a transverse rod 82 which is mounted in bearings in the upper ends of the brackets 83, and 84, which, in turn, are fastened to the base 65 of the main frame. The springs 81 are coiled around the rod 82. One end of each spring is outwardly turned and rests against the corresponding bracket 84 and its other end is inwardly turned and rests against the corresponding arm 80. The record-receiving element moves over the table 85 and around the cylinder 73 and passes then out between the front upper and lower delivery rollers 86 and 87 which are fixed on upper and lower shafts 88 and 89, as best shown in Figures 9, 10 and 11. The ends of the shaft 88 and 89 are mounted to rotate in the upstanding side arms 90, whose lower ends have bearings on the transverse rod 91. The ends of this rod are supported by the side plates 57, 58 and also by brackets 92, upstanding from the base 66. Tension springs 93, are coiled around the rod 91 with one end of each spring outwardly turned and bearing against the corresponding bracket 98 and the other end thereof inwardly turned and bearing against the corresponding arm 90 whereby the delivery rolls are held in yielding contact with the cylinder 73.

At the front of the recording machine there is a motor 94 which is mounted on the base 65, as is best shown in Figure 6. Fixed on the shaft of this motor there is a spur gear 96 which is in mesh with, and drives, a larger spur gear 97. This spur gear 97 is fixed on a transverse shaft 98 which has a bearing in the plate 57 and also in the bracket 99 which upstands from the base 65. The speed of the motor 94 is controlled by electrical governor means or by a conventional governor 100 which is mounted on the shaft 98. On the other end of the shaft 98 there is fixed a bevel gear 101 which is in mesh with, and drives, a bevel gear 102 fixed on the lower end of the vertical shaft 103. This vertical shaft rotates in suitable bearings in a bracket 104 which is fixed to the upstanding side plate 58. Fixed to the upper end of the shaft 103 there is a worm 105 which is in mesh with, and drives, the worm gear 106 which is fixed on a clutch sleeve 107. This clutch sleeve 107 is held in position, and is revolvable, on a transverse shaft 108 by the keyway sleeve 109 which is fixed on the shaft 108. The inner end of the clutch sleeve 107 is formed into an annular clutch jaw 110. The clutch sleeve 107 and the worm gear 106 being fixed together rotate in one direction only but the shaft 108 and the keyway sleeve 109 may revolve in either direction.

Fixed on the shaft 98 there is a spur gear 111 which is in mesh with, and drives, a spur gear 112 which is fixed on the transverse shaft 113. This shaft is mounted to rotate in suitable bearings in the upstanding side plates 57, 58 of the main frame and has sprocket wheel 113a fixed thereon. This sprocket wheel 113a is aligned with a corresponding sprocket wheel 114 which is mounted on a clutch sleeve 115 which, in turn, is rotatably mounted on the shaft 108. A sprocket chain 116 operates over these aligned sprocket wheels and transmits rotation from the former to the latter. The inner end of the clutch sleeve 115 is formed with a clutch jaw 117. Referring to Figures 8, 11, and 12, there is a clutch member 118 which is slidably mounted on the keyway sleeve 109 with inwardly extended pins fixed thereto and which slide in a keyway 120 of the keyway sleeve 109. The clutch member 118 is formed at its ends into clutch jaws and when said clutch member is shifted into clutching relation with the clutch jaw 110, the shaft 108 will be driven in the direction of rotation and at the rate of speed of the worm gear 106 and when the said clutch member 118 is shifted into engagement with the clutch jaw 117, the shaft 108 will be driven in the direction of rotation and at the same rate of speed as the sprocket wheel 114.

The clutch member 118 has an external annular groove 121 therearound, as shown in Figure 12, and there is a yoke 122 which is mounted to rotate on a vertical axis in a cross-plate 123 carried by the main frame. This yoke has the upper and lower laterally extending arms 124, 125 which carry the pins 126, 127 that project into said groove 121 whereby, upon rotation of the yoke, the clutch member 118 may be shifted into either of said clutching relations hereinabove referred to.

Fixed on the shaft 108, there is a spur gear 128 which is in mesh with spur gears on idler bracket 200 which in turn drives, a larger spur gear 129, which is fixed on the screw shaft 130. This screw shaft is on line with and located midway between shafts 142 and 142a and has transversely aligned bearings in the upstanding side plates 57, 58, as best shown in Figure 6. The screw shaft 130 has an externally threaded portion 131 on which half nuts 133 and 133a are threaded as shown in Figures 16 and 17.

In the operational cycle, the direction of movement of the timing element, or the stylus element, along shafts 142 and 142a is controlled by the clutch member 118; that is, when clutch member is shifted into engagement with the clutch jaw 110, the shaft 108 will be driven through the worm 105 and worm gear 106 at a very slow rate of speed and the shaft 130 will be driven through the gearing 128, idler gears 200 and gear 129 at a slow rate of speed; but, upon shifting of the clutch member 118 into engagement with the clutch jaw 117, the shaft 108 will be driven through the sprocket wheel 114 at a fast rate of speed and, accordingly, the shaft 130 will be driven through the gearing 128, the idler gears 200 and spur gear 129 at a fast rate of speed. Therefore, the timing element 207 when engaged by half nut 133 with screw 131, will move to the right comparatively slowly but will be rapidly returned in a left direction to the initial starting point, the detailed operation being explained hereinafter. It may be here stated that the operation of the clutch member 118 is controlled through the yoke 122 which is co-ordinated mechanically with the measuring device previously explained. It may also be noted that other timing scales may be used by providing different speeds for shaft 113 through additional sliding gears (not shown) which may be mounted on shafts 198 and 113.

Fixed on the shaft 59, there is a disc 135 as best shown in Figures 7 and 8. This disc is preferably located between the upstanding side frame 54 and the side plate 58. The disc 135 is provided with two marginal notches 136 and 136a, spaced at 180 degrees, and, riding on the margin of the disc 135, there is a roller 137 which is mounted on the lower end of the depending arm of a bell crank 138. This bell crank is pivotally mounted on a shaft 139 which extends transversely through the side plate 58. This bell crank 138 is fixed to the end of the transverse shaft 139 which is mounted to rotate in a suitable transversely aligned bearing in the upstanding side plate 58. A pull spring 143 is connected at one end to the upwardly extended arm of the bell crank 138 and said spring is connected at the other end to an adjustable arm 144 which is attached to, and upstands from, the upstanding side plate 58. Accordingly, the roller 137 is held in yielding contact with the margin of the disc 135 by the pull of the spring 143 on the bell crank 138.

The disc 135, being fixed on the same shaft as the ratchet 56, will rotate with said ratchet and the roller 137 will ride around the margin of said disc and will drop into the notches 136 and 136a with each revolution of the disc. This will allow the bell crank 138 to move downwardly and the upstanding arm of the bell crank 138 to move forwardly under the influence of the pull of the spring 143 and thus causing a partial rotation of the shaft 139. Fixed to the end of shaft 139 on the inside of the upstanding side frame 58, is trip arm 30 which has an adjusting screw 31 through the outer end. Fixed to the upstanding side frame 58 is a single pole single throw normally open microswitch 32 whose button is directly below the adjusting screw 31 of the trip arm 30. As explained above, the partial rotation of shaft 139 causes the adjusting screw 31 to contact the actuating button of microswitch 32 closing the circuit, and causing the armature of relay 34 shown in diagrammatic drawing Figure 21 to close and latch in that position until later released. The complete function of this operation will be explained hereinafter.

Referring now to Figures 6, 7, 11, and 11a, pivotally mounted on the upper end of a fixed post 145, there is a bell crank 146 which is fixed to and upstands from the transverse plate, or table, 123. A connecting rod 147 is pivotally connected, at one end, to the upstanding arm of the bell crank 138 and is pivotally connected, at its other end, to the laterally turned arm of the bell crank 146. The other arm of the bell crank 146 is pivotally connected to one end of a connecting rod 148. In the other end of the connecting rod 148, there is an elongated slot 149 and a pin 150 works through said slot and is fixed to the end of the arm 151 underneath. A slide plate 152 is adjustably mounted on the connecting rod 148. It has an elongated slot 152a to receive a clamp screw 153 which is screwed into the rod 148. One end of this slide plate extends over the adjacent end of the slot 149 and by loosening the screw 158 the slide plate 152 can be adjusted so as to, in effect, lengthen or shorten the slot 149 and the screw 153 may then be tightened to clamp the slide plate 152 securely to the rod 148.

It will be noted that the arm 151 is pivotally mounted on the upper end of the post 154 which is fixed to the platform 123 and the connecting rod 148 is connected to one end of said arm 151. The other end of the arm 151 is provided with deep notch 155 through which the screw pin 166 extends loosely and this screw pin is attached, eccentrically, to the collar 167. Extending through the platform 123, there is a sleeve bearing 168 which is held in position by the upper end lower lock nuts 169 and the shank of the clutch yoke 122 works through this sleeve bearing 168 and the collar 167 is. securely fixed thereto. Around the post 154, there is a coil spring 170, one end of which is attached to the post and the other end of which is connected to the pivotally mounted arm 151. On the cross-plate, or platform, 123, there is a fixed bracket 171 on which a trigger 172 is pivotally mounted. The bracket 171 is at right angular relation to the pivotal arm 151 so that the arm may be engaged under the dog of said trigger and thereby held until released, as hereinafter explained.

As best shown in Figure 6, there is a rod 172a pivotally connected, at one end, to said trigger and whose other end is pivotally connected to one end of the arm 173 that is pivotally mounted on post 174 which upstands from the plate, or platform, 123. There is an upstanding post 175, preferably square in cross-section and which upstands from said plate, or platform, 123. Threaded through the post 175 there is an adjusting screw 176 which may be adjusted so as to regulate the range of travel of the arm 173 thereby controlling the depth that the trigger 172 may drop over the pivotally mounted arm 151.

The trigger is held under tension by means of a pull spring 177 which is attached, at one end, to the pivotally mounted arm 173 and at its other end to post 175. Threaded through the opposite end of the arm 173 there is an adjusting screw 178 which is arranged to contact with a bracket 179 upstanding from the timing element 207 thus raising the dog of the trigger 172 through the connections just described and thus allowing the pivotally mounted arm 151 to resume its normal position, which normal position will be assumed under the influence of the spring 170.

As previously stated, shafts 142, 142a and screw shaft 130 are mounted in line and equidistance apart in suitable bearings in upstanding frame 57. The outer end of screw shaft 130 is mounted in bearings in upstanding frame 58 and the outer end of shafts 142 and 142a mounted in upstanding side frame 54. The shafts 142 and 142a are provided with longitudinal keyways 180 and 180a extending their entire length. On the outer end of shafts 142 and 142a are toggle arms 201 and 201a mounted between upstanding frame 58 and upstanding side frame 54, best shown in Figure 7. The toggle arms 201 and 201a are connected by bar 202, one end of which is fastened to the armature of solenoid 203, the other end extending through bracket 204 mounted with screws on the upstanding frame 58. On the portion of the bar 202 extending through bracket 204, is a spring 205, the tension of which is adjusted by nut 206.

Slidably mounted on shafts 142 and 142a is the timing element 207 and the stylus element 208. Best shown in detail in Figures 13, 14, 15, 16, 17, 18, 19 and 20. The component parts of the timing element 207 and the stylus element 208 are identical but mounted on the shafts 142 and 142a in reverse so that the centers of the respective elements will assume the same position opposite the record receiving element 75.

The timing element 207 and stylus element 208 are composed of upper and lower frames 209 and 209a, and being identical, are held in alignment by screws 210. There is a transverse half-round recess 211 and 211a in each end of frames 209 and 209a in which eccentric bushing 212 is fitted and rotates in recess 211. There is an eccentric bushing 212 affixed in recess 211a. There is also a transverse half-round recess 223 located mid-distance between the half-round recesses 211 and 211a in which screw shaft 130 rotates. There is a longitudinal square recess 214 across the center section of frames 209 and 209a in which is slidably mounted half nuts 133 and 133a. There is a transverse rectangular recess 215 across frames 209 and 209a in which is fitted cross-bar 216. Through cross-bar 216 is slidably mounted pin 217, one end of which is fixed in the center of half nut 133. The other end, having an oval head, is held in position against eccentric bushing 212 by compression spring 218. Pin 219, extending through eccentric bushing 212, is loosely fitted in the keyways of shafts 142, best shown in Figure 16. Similarly pin 217a extends between half-nut 133a and eccentric bushing 212a, and pin 219a attaches bushing 212a to shaft 142a. Mounted on the underside of stylus element 208 is a single pole double throw microswitch 220 with a lever type actuating member. Mounted on the underside of the timing element 207 is bracket 221 with an adjusting screw 222 extending through the bracket to regulate the trip of microswitch 220. Suspended from the microswitch 220 are three flexible electrical conduits which move transversely of the instrument with the movement of the stylus element 208, shown in diagrammatic drawing, Figure 21.

Forthwith follows the combined electrical-mechanical functions of the coordination of the above-described apparatus.

Referring to Figure 6, and as previously explained, the motor 94 drives the screw shaft 130 at a slow rate of speed during the timing cycle and timing element 207 commences its timing cycle when the center of the element is opposite the furthermost left line of record receiving element 75, herein called the zero line. During the progress of drilling, with each contact of the segments 38 (of Figure 4), the record receiving element 75 is moved intermittently forward to scale, stylus 186a marks a substantially vertical line on the record receiving element 75. During the time the timing element is moving from the zero line, on the left, to the right at a selected rate of speed, stylus element 208 remains in the position it had assumed at the end of the time the previous foot had been drilled. Should the foot being drilled be of greater duration of time than the previous foot, then the timing element merely pushes the stylus ahead of it until the screw shaft 130 is reversed in its direction of rotation as previously explained, causing the timing element to return to the zero position for the commencing of the timing cycle of the succeeding foot. During the timing cycle the half nut 133a is in contact with the extended screw portion 131 of shaft 130. Spring 205 (Figures 6 and 7) is exerting pressure on bar 202, causing a partial counter-clockwise rotation of shafts 142 and 142a as both shafts are interconnected through toggle arms 201 and 201a. In this manner, with the partial rotation of said shafts, pins 219 inserted in keyways 180 and 180a causes the partial rotation of eccentric bushings 212 and 212a. Bushing 212a of the timing element 207 is rotated in a direction to cause the raised portion of said bushing to push pin 217a against the pressure of spring 218a, thereby engaging the half nut 133a in contact with screw portion 131 of shaft 130. This position is maintained during the entire timing cycle. However, should the foot being drilled be of less duration in time than the previous foot, then on completion of the last contact of segment 38 of commutator 33 which causes the disc 135 (refer to Figure 7), to be rotated clockwise, thereby causing the partial rotation of shaft 139, previously explained, to close the electrical circuit of microswitch 32, and causing the armature of relay 34 to latch closed (best shown in diagrammatic sketch, Figure 21). The circuit then flows through the armature of relay 34, through microswitch 220 on the underside of stylus element 208 to solenoid 203 whose armature is drawn to the center thereof, causing the shafts 142 and 142a to partially rotate in a clockwise direction. This in turn causes the half nut 133a of the timing element 207 to become disengaged from the screw portion 131 of shaft 130 and the half nut 133 of stylus element 208 to become engaged and since through the same mechanical function of disc 135, screw shaft 130 has been caused to rotate at an accelerated rate of speed in the opposite direction of the timing cycle. Then stylus element 208 will move rapidly to the left to the position of the timing element 207, marking a transverse line on record receiving element 75 during its progress. As the stylus element moves into the position of the timing element, the screw 222 comes into contact with the actuating lever of micro-switch 220, opening the circuit to solenoid 203 and at the same instant closing the circuit through the other pole to release coil of latch relay 34. Spring 205, which has been under tension during this operation, instantly causes the partial counter-clockwise rotation of shafts 142 and 142a, engaging the half nut 133a of timing element 207 and disengaging half nut 133 of stylus element 208. With the exchange of position, timing element 207 then moves rapidly to the left until upright pin 179 comes in contact with adjusting screw 178 to reverse the direction of rotation of screw shaft 130, as previously described. From this description it will be seen that stylus 186a remains in contact with the record receiving element 75 during the progress of drilling and that the record thereof shows the difference in the time consumed in drilling each foot of formation encountered.

To recapitulate, if the unit being drilled is of greater duration of time than the previous unit, then the stylus is pushed by the timing element to the right until the end of the time consumed and then returned to the zero position at a rapid rate of speed, leaving the stylus in its assumed position during the timing of the next cycle. If the unit being drilled is of less duration of time, then at the end of the timing cycle the timing element remains at its timing position and the stylus element moves rapidly to the left to the position of the timing element where they exchange positions and the timing element then proceeds at a rapid rate of speed to the zero position where it begins its next timing cycle.

I claim as my invention:

1. A well logging machine for use in connection with well drilling equipment and comprising in combination, means holding and advancing a movable record receiving element, means connecting with said drilling equipment in a manner advancing said record receiving element at a rate of speed determined by the speed of the downward movement of the drill stem of said equipment, a movable stylus maintained in contact with said record receiving element, a movable split stylus carriage having a movable timing section and a stylus marking section, with each of said sections adapted to engage and disengage with a power driven screw shaft, a movable clutch and gearing connecting said screw shaft with a driving means rotating the latter at selected rates of speed, linkage and gearing means connecting said clutch with said means for holding and advancing said record receiving element, with said linkage and gearing means operative with said element advancing means to provide contact between said sections of said stylus carriage and to subsequently move said clutch and reverse the direction of rotation of said screw shaft and reposition the timing section of said split carriage while simultaneously disengaging said marking section, and providing thereby a continuous single line record of the time consumed for a predetermined increment of downward movement of said drill stem and of the difference in time consumed for successive increments of depth.

2. In a well logging machine for use in connection with well drilling equipment and having automatic means holding and advancing a movable record receiving element with said means including an electrical commutator, an electrical relay, a motor, and gearing and linkage moving said record receiving element intermittently forward responsive to predetermined intervals of descent of the drill stem of said equipment, a movable stylus and stylus carriage adapted to move transversely with respect to said record receiving element, a rotatable power driven screw shaft engageable with the stylus carriage, a movable clutch and gearing connecting said screw shaft with a driving means rotating the latter at selected rates of speed, with linkage and gearing means connecting said clutch with said automatic means for holding and advancing said record receiving element, a portion of said linkage and gearing means operative to move said clutch and reverse the direction of rotation of said screw shaft, to reposition said stylus and stylus carriage, the improvement which comprises, providing a split stylus carriage having a timing section and a stylus holding and marking section, each section engageable with said screw shaft through a movable half-nut housed therein, and additional linkage connecting with said means for holding and advancing said record receiving element and operating said clutch, said additional linkage operative to bring said sections of said carriage together for a recording of the time elapsed for each increment of downward movement of said drill stem and to provide automatically a continuous single line mark and record of the time consumed for the predetermined increment of downward movement, with said stylus being maintained in constant contact with said record receiving element, and in addition to reverse the direction of rotation of said screw shaft through said clutch means and engage said timing section of said carriage through its half nut whereby the latter moves independently to a starting position on said screw shaft and at a zero point with respect to said record receiving element.

3. The logging machine of claim 2 further characterized in that within said additional linkage a notched rotating disc connects to and turns with said means for advancing said record receiving element, a pivoted bell crank has one end thereof contacting the margin of said notched disc and pivots as said end contacts the notches thereof, the other end of said bell crank connects through movable pivoted arms to a second bell crank, last said bell crank connecting with said clutch and operative to reverse the rotation of said screw shaft and move said timing section of said carriage rapidly to said zero point at the edge of said record receiving element.

4. The machine of claim 3 still further characterized in that an adjustable pin at one end of a pivoted bar connect through linkage to said second mentioned bell crank, with said pin and bar being positioned to contact said timing section, whereby the latter upon contacting said pin repositions said clutch member and reverses the rotation of said screw shaft to stop said timing section and start its controlled and timed transverse movement from the zero point of said record receiving element.

5. In a well logging machine for use in connection with well drilling equipment, and having in combination, automatic means holding and advancing a movable record receiving element, with said means including an electric power supply, a mechanically driven electrical commutator, an electrical relay, a motor, and gearing and linkage moving said record receiving element intermittently forward responsive to predetermined intervals of descent of the drill stem of said drilling equipment, a movable stylus and stylus carriage adapted to move transversely with respect to said record receiving element, a rotatable power driven screw shaft engageable with the stylus carriage, a movable clutch and gearing connecting said screw shaft with a driving means rotating the latter at selected rates of speed, with additional linkage and gearing means connecting said clutch with said automatic means for holding and advancing said record receiving element, a portion of said additional linkage and gearing means operative to move said clutch and reverse the direction of rotation of said screw shaft and to reposition said stylus and stylus carriage, the improvement which comprises, providing a divided stylus carriage having a timing section and a stylus holding and marking section, each section having therein a rotatable eccentric bushing and a movable half-nut, the latter adapted to engage with and disengage from said power driven screw shaft by the movement of said eccentric bushing, a pair of control shafts extending parallel with said driven screw shaft, with one control shaft on each side of said screw shaft and arranged to extend through the eccentric bushings of said sections of said carriage and hold said carriage sections in slidable horizontal positions, and said control shafts operative through said eccentric bushings and half-nuts, to effect the independent movement of each of said sections of said carriage, a rotatable notched disc connecting to and turning with said means for directing said record receiving element, a pivoted bell crank positioned having one end thereof in contact with the periphery of said disc in a manner pivoting upon contact with the notches thereof, pivoted members from said bell crank connective with a second bell crank, the latter connecting with said movable clutch and said clutch connecting said screw shaft with said driving means to effect a change in the direction of rotation of said shaft and a repositioning of said sections of said carriage with respect to said record receiving element, a stop bracket on said timing section, a pivoted bar at the zone of said zero point arranged to contact said bracket of said timing section and linkage from said pivoted bar connecting with said second mentioned pivoted bell crank, whereby said clutch is repositioned and said screw shaft has its normal timed direction of rotation resumed as said timing section reaches the zero point with respect to said record receiving element, electrically controlled linkage connects with said pair of control shafts to rotate the latter, whereby said timing section of said carriage is maintained in engagement with said screw shaft and said stylus marking section is maintained in disengagement with said screw shaft until the end of the increment of downward movement of said drill stem and electrical relay means move said sections of said carriage together for a recording of the time elapsed for each increment of downward movement of said drill stem whereby said stylus on said stylus section marks automatically a continuous single line record of the time consumed for the predetermined increment of downward movement.

6. The well logging machine of claim 5 further characterized in that a movable reciprocating bar has one end thereof connected to an electrical solenoid and the other end thereof to a spring member, a pair of pivoted toggle arms connecting said reciprocating bar with said pair of control shafts, whereby said shafts are partially rotated by said spring member on one end of said bar when said solenoid is de-energized and said shafts are partially rotated in an opposite direction when said solenoid is electrically energized, with said eccentric bushings within said carriage sections being rotated by said control shafts, and said eccentric bushings engaging and disengaging said separate carriage sections with said screw shaft by effecting the movement of said half-nuts in said sections.

7. The machine of claim 6 still further characterized in that an electrical switch is mounted on said stylus carriage section, and a second switch connects to a rotatable pin extending from and pivoting first said bell crank which is in contact with said notched disc, with last said switch being closed as said bell crank pivots upon contact with each notch of said disc, an electrical circuit provides current flow through said second switch to said solenoid when said switch on said stylus section is open, with said energized solenoid and connecting reciprocating bar and toggle arms effecting the rotation of said control shafts whereby the movable half nut of said timing section is disengaged and the half nut of said stylus section is engaged with said screw shaft during the reverse rotation of the latter and said sections of said carriage are brought together, a contact between the sections of said carriage effects a closing of first said switch on said stylus carrying section and the cut-off of current flow to said solenoid, and said spring attached to said reciprocating bar maintains said toggle arms and shafts in a position whereby said stylus section is disengaged from said screw shaft and said timing section is engaged therewith for both repositioning and regulated timed movement with respect to said record receiving element.

8. The machine of claim 5 further characterized in that each of said separate sections of said divided stylus carriage have detachable upper and lower portions, with each portion having spaced half round recesses therein and a longitudinal rectangular slot, whereby said portions when assembled form enclosures encompassing said eccentric bushings, said screw shaft, and said half-nut which engages the latter.

HERSCHELL R. SCIVALLY.

REFERENCES CITED

The following references are of record in the file of this patent:

UNITED STATES PATENTS

| Number | Name | Date |
|---|---|---|
| 2,365,014 | Silverman et al. | Dec. 12, 1944 |
| 2,390,178 | Rutherford | Dec. 4, 1945 |
| 2,535,096 | Scivally | Dec. 26, 1950 |